Figure 1:
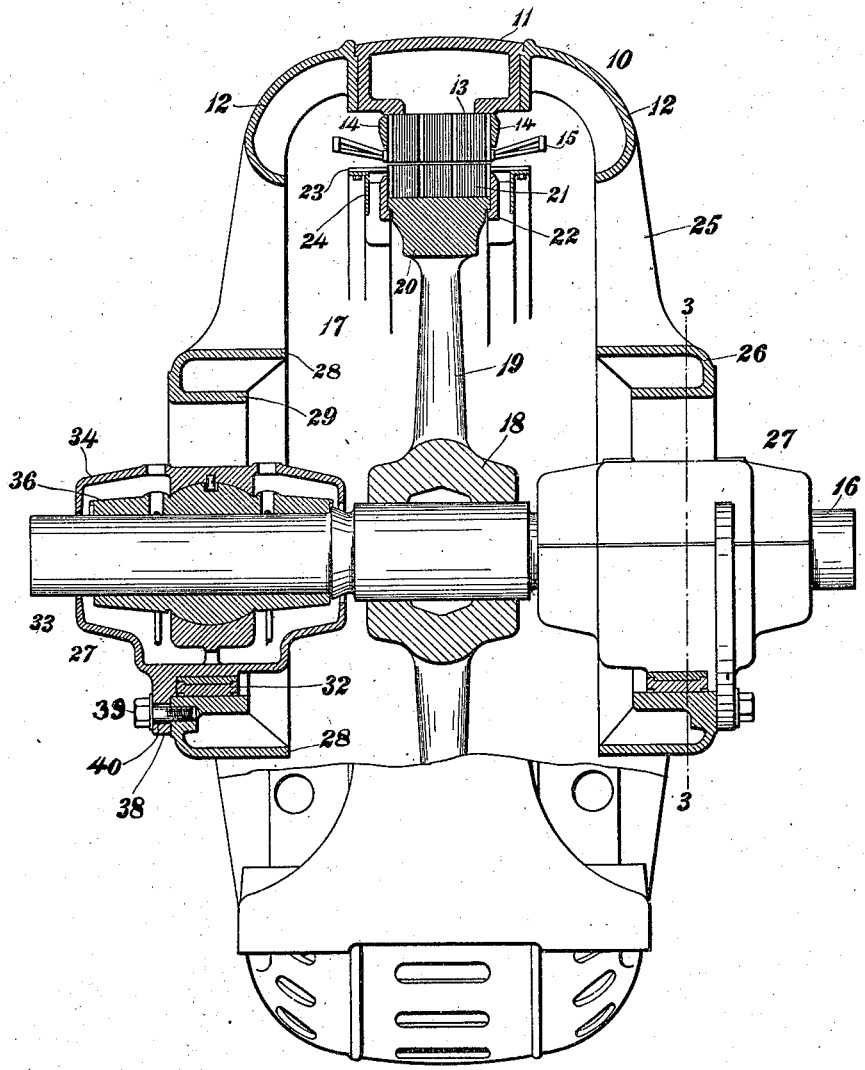

W. D. POMEROY.
DYNAMO ELECTRIC MACHINE.
APPLICATION FILED JUNE 16, 1906.

932,641.

Patented Aug. 31, 1909
2 SHEETS—SHEET 2.

WITNESSES:

WILLIAM D. POMEROY
INVENTOR.

BY
ATTORNEY.

UNITED STATES PATENT OFFICE.

WILLIAM D. POMEROY, OF NORWOOD, OHIO, ASSIGNOR TO ALLIS-CHALMERS COMPANY, A CORPORATION OF NEW JERSEY, AND THE BULLOCK ELECTRIC MANUFACTURING COMPANY, A CORPORATION OF OHIO.

DYNAMO-ELECTRIC MACHINE.

932,641.  Specification of Letters Patent.  Patented Aug. 31, 1909.

Application filed June 16, 1906. Serial No. 321,959.

*To all whom it may concern:*

Be it known that I, WILLIAM D. POMEROY, citizen of the United States, residing at Norwood, in the county of Hamilton and State of Ohio, have invented certain new and useful Improvements in Dynamo-Electric Machines, of which the following is a full, clear, and exact specification.

My invention relates to dynamo-electric machines and particularly to motors having small air-gaps between the rotary members or rotors and the stationary members or stators, such as induction motors.

In order that the efficiency of an induction motor may be high, it is necessary that the air gap be very small. The length of the air gap depends upon the size of the motor, varying from about twelve thousandths of an inch for small motors, to about four hundredths of an inch for the largest motors. It is seen that in these machines all parts must be accurately machined and the greatest care must be exercised in assembling the parts to center the rotor exactly with reference to the stator in order that the torque may be uniform at all parts of the machine.

In a large machine the weight of the rotor is considerable and large bearings must be provided. It has been found that even with bearings of ample size, in time the weight of the rotor causes the bottoms of the bearings to wear away, causing the air gap at the bottom of the machine to become less than at the top. Should the bearings of a large machine wear away even a slight amount, the difference between the air gaps at the top and bottom of the machine would be relatively very great; for example a wear of one hundredth of an inch in a machine having the greatest air gap would cause a difference in the lengths of the gap at the top and bottom amounting to forty or fifty per cent. of the original amount.

The attraction between the stator and rotor is proportional to the length of the air gap and therefore when the air gap at different parts of the motor is unequal the attractions at those parts are unequal. Consequently if the lower parts of the bearings have been worn away even a slight amount, the attraction between the stator and rotor at the bottom is greater than at the top causing a pressure on the bearings in addition to that due to the weight of the rotor, and as the difference in the air gap at the top and bottom increases this abnormal pressure increases, resulting in a rapid wearing away of the bearings. The result is that new bearings must from time to time be added to the machine, which is not only difficult and costly, but results in the machinery driven by the motor remaining idle for considerable periods.

The object of my invention is to provide means whereby the air gap can, when necessary, be adjusted so as to equalize the torque at all parts of the machine or to decrease the pressure on the bearings, thus prolonging the life of the bearings.

In carrying out my invention I provide means for adjusting the bearings of the induction motor.

More specifically considered my invention consists in a motor having bearing-housings integral with the stator frame, bearings for the rotor shaft supported by the housings, such as adjustable wedges between the housings and the bearings for adjusting the position of the shaft vertically, and means such as screws or bolts for adjusting the bearings laterally, each bearing having an integral flange extending over the end of the housing whereby the bearings can be bolted to the housings to secure them in their adjusted positions.

My invention still further consists in the details of construction and in the combinations of elements described in the specification and set forth in the appended claims.

For a better understanding of my invention, reference is had to the accompanying drawings forming a part of this application in which—

Figure 2:
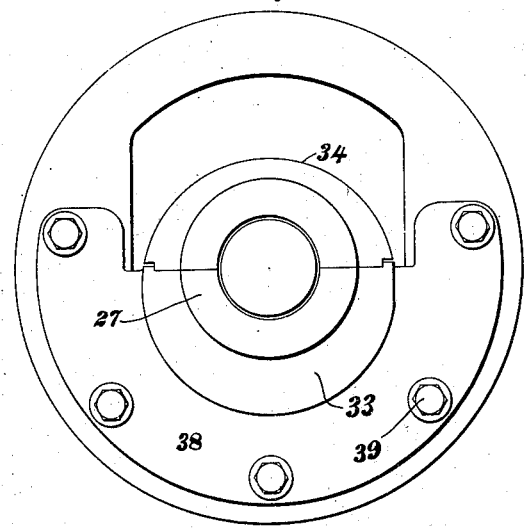
Figure 3:
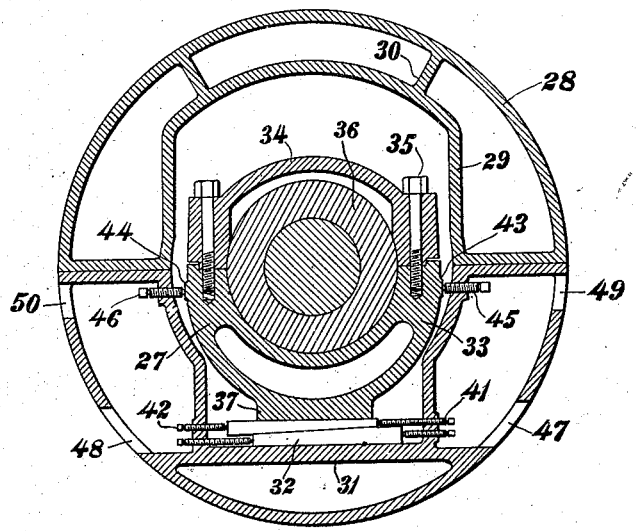

Figure 1 is a sectional side elevation of an induction motor equipped with my invention; Fig. 2 is an end elevation of one of the motor bearing-housings and the bearing supported thereby; and Fig. 3 is a vertical section of the same, the section being taken approximately along the line 3—3 of Fig. 1.

Referring now to the figures of the drawing, I have shown at 10 the stator of an induction motor, having a frame comprising a yoke 11 and end-housings 12. The stator core is shown at 13 and consists of groups of laminæ held between end-heads 14 and secured to the yoke in any suitable manner. The core is provided with the usual stator windings, the end-turns of which are shown at 15. Mounted on the shaft 16 is a squirrel cage rotor 17, consisting of a spider having a hub 18, radial arm 19 and rim 20. The rotor core 21 is mounted on the outer periphery of the rim and consists of groups of laminæ held between end-heads 22. Mounted in the slots of the rotor core are bars 23 of good conducting material, joined together at their ends by end-rings 24. The air gap between the rotor and stator cores as here shown is very much exaggerated for the sake of clearness. The details so far described form no part of my invention, and further description is thought to be unnecessary.

The end-housings have inwardly extending arms 25 and integral bearing housings 26. The frame preferably consists of two sections, being divided along the center of the shaft, thus dividing the bearing-housings into two halves as is shown in the drawings, the upper half of each bearing-housing being integral with the upper half of one of the end-housings of the frame, and the lower half of each bearing-housing being integral with the lower half of one of the end housings of the frame. Each complete bearing-housing, as is shown in Figs. 2 and 3, is circular in outline and is provided with a central opening to receive the shaft bearing 27. Each housing is cored out as shown leaving an outer circular flange 28 and an inner flange 29, the flanges being joined together by connecting ribs 30. The lower part of each housing is provided with a horizontal portion 31 upon which rest the adjustable wedges 32 having their inclined faces in engagement with each other.

The shaft bearings 27, which are supported by the bearing-housings, each consist of a main portion 33 having a removable cap 34 held in position by screws or bolts 35, and support a bearing-bushing 36. As shown clearly in Fig. 3, each bearing is provided with a downwardly extending portion 37, with the lower face of which is horizontal and rests directly upon the wedges 32. The lower portion of each of the bearings is provided with a flange 38 which extends over the end of the lower half and the lower portions of the upper half of the bearing-housing. This flange fits closely against the end of the housing and is secured thereto by a number of equally spaced bolts 39, which bolts pass through openings 40 in the flange slightly larger in diameter than the bolts, as is shown in Fig. 1, so as to permit an adjustment of the bearing. These bolts assist in supporting the bearings and holding the latter in their adjusted positions.

At 41 and 42 opposite the wedges and on each side thereof are wedge adjusting and holding screws or bolts, which pass through threaded openings in vertical portions of the inner flange of the lower half of each bearing-housing. As shown the screws or bolts 41 and 42 bear against the ends of the wedges and provide means for adjusting the latter and for holding them in their adjusted positions. Each bearing is provided on opposite sides with lugs 43 and 44 adapted to receive ends of the screws or bolts 45 and 46 for adjusting the bearings laterally. These adjusting screws or bolts 45 and 46 are also mounted in threaded openings in the inner flanges or walls of the lower halves of the bearing-housing. The bearing-housings are provided with openings 47 and 48 opposite the adjusting screws 41 and 42 and with openings 49 and 50 opposite the adjusting screws 45 and 46 by means of which access can be had to the screws with any suitable tool.

When it is desired to adjust the bearings the bolts 39 are first slightly loosened and then by means of screws 41 and 42, the bearings can be adjusted vertically and by means of screws 45 and 46 the bearings can be adjusted laterally if lateral adjustment is also necessary. When the rotor is in the proper position, the bolts 39 are tightened, thus assisting in supporting the bearings and holding them in their adjusting positions.

I do not wish to be confined to the details of construction as many changes and modifications can be made without departing from the spirit and scope of my invention, and I aim in my claims to cover all such modification.

What I claim as new and desire to secure by Letters Patent is:—

1. In a dynamo-electric machine, a stator comprising a frame having integral bearing-housings, a rotor, a shaft on which the rotor is mounted, bearings for said shaft, adjustable wedges between the housings and the bearings upon which wedges the bearings rest, means for adjusting the positions of said wedges, and bolts for securing the bearings in the adjusted positions.

2. In a dynamo-electric machine, a stator comprising a frame having integral bearing-housings, bearings for the shaft, each bearing having a flange, means for adjusting the positions of the bearings, and bolts passing through the flange into the housings for securing the bearings in the adjusted positions.

3. In a dynamo-electric machine, a stator comprising a frame having integral bearing-housings, a rotor, a shaft on which the rotor is mounted, bearings for the shaft, each bearing having a flange over the end of the housing, means for adjusting the positions of the bearings, and bolts passing through the flanges and into the housings for securing the bearings in the adjusted positions.

4. In a dynamo-electric machine, a stator comprising a frame having integral bearing-housings, a rotor, a shaft on which the rotor is mounted, bearings for the shaft, adjustable wedges on which the bearings rest, each of said bearings having a flange extending over one of the housings and in engagement therewith, and bolts passing through the flange into the housing, the diameter of the bolt holes in the flange being larger than the diameter of the bolts.

5. In a dynamo-electric machine, a stator comprising a frame having integral bearing-housings, a rotor, a shaft on which the rotor is mounted, bearings for said shaft, wedges carried by said housings for supporting the bearings, means for adjusting the wedges to adjust the shaft vertically, and means for adjusting the bearings laterally.

6. In a dynamo-electric machine, a stator comprising a frame having integral bearing-housings, a rotor, a shaft on which the rotor is mounted, bearings for said shaft, adjustable wedges carried by said housings and supporting the bearings, means for adjusting the wedges to adjust the shaft vertically, means for adjusting the shaft laterally, a flange extending over the ends of the housings, and bolts passing through the flange into the housings for holding the bearings in adjusted position.

In testimony whereof I affix my signature, in the presence of two witnesses.

WILLIAM D. POMEROY.

Witnesses:
ARTHUR F. KWIS,
FRED J. KINSEY.